(12) United States Patent
Dennison et al.

(10) Patent No.: US 7,434,776 B2
(45) Date of Patent: Oct. 14, 2008

(54) MOUNTING METHOD AND SYSTEM

(75) Inventors: Shawn T. Dennison, 1728 Russet Leaf Ct., El Cajon, CA (US) 92019; Stanely C. Aguilar, El Cajon, CA (US)

(73) Assignee: Shawn T. Dennison, El Cajon, CA (US)

( * ) Notice: Subject to any disclaimer, the term of this patent is extended or adjusted under 35 U.S.C. 154(b) by 270 days.

(21) Appl. No.: 11/328,620

(22) Filed: Jan. 10, 2006

(65) Prior Publication Data

US 2007/0158514 A1 Jul. 12, 2007

(51) Int. Cl.
*E04G 3/00* (2006.01)

(52) U.S. Cl. ............ 248/278.1; 248/276.1; 248/280.11; 396/419; 396/420; 396/421; 396/422

(58) Field of Classification Search ............... 248/276.1, 248/278.1, 280.11, 222.52, 220.21, 220.22, 248/187.1, 176.3, 181.3, 281.11; 396/419, 396/420, 421, 422, 423, 424, 425, 426, 427, 396/428; 403/64; 361/683
See application file for complete search history.

(56) References Cited

U.S. PATENT DOCUMENTS

| | | | | |
|---|---|---|---|---|
| 3,855,602 A | * | 12/1974 | Hoos | 396/422 |
| 3,893,145 A | * | 7/1975 | King | 396/422 |
| 4,051,493 A | * | 9/1977 | Nakagawa et al. | 396/155 |
| 4,091,402 A | * | 5/1978 | Siegel | 396/422 |
| 4,447,170 A | * | 5/1984 | Holmes | 403/64 |
| 4,752,794 A | * | 6/1988 | Bohannon | 396/189 |
| 4,916,471 A | * | 4/1990 | Tussey | 396/28 |
| 5,075,706 A | | 12/1991 | Miyazaki | |
| 5,095,408 A | | 3/1992 | Chen | |
| 5,226,708 A | | 7/1993 | Katahira et al. | |
| 6,394,403 B1 | * | 5/2002 | Hung | 248/276.1 |
| 6,729,592 B1 | * | 5/2004 | Kurtts | 248/278.1 |
| 7,289,315 B2 | * | 10/2007 | Hillman et al. | 361/683 |

* cited by examiner

*Primary Examiner*—Brian Glessner
*Assistant Examiner*—Todd M. Epps
(74) *Attorney, Agent, or Firm*—Bernard L. Kleinke; Duckor Spradling Metzger & Wynne

(57) ABSTRACT

A method and system are disclosed, may include a mounting device for a piece of equipment having an accessory receptacle. The mounting device may include at least two arms connected together providing at least two rotation axes, a mounting stud for mating with the accessory receptacle and connected to one of the two arms providing at least one rotation axis, and a mount for mating with an accessory of the equipment and connected to the other one of the two arms providing at least two rotation axes.

10 Claims, 3 Drawing Sheets

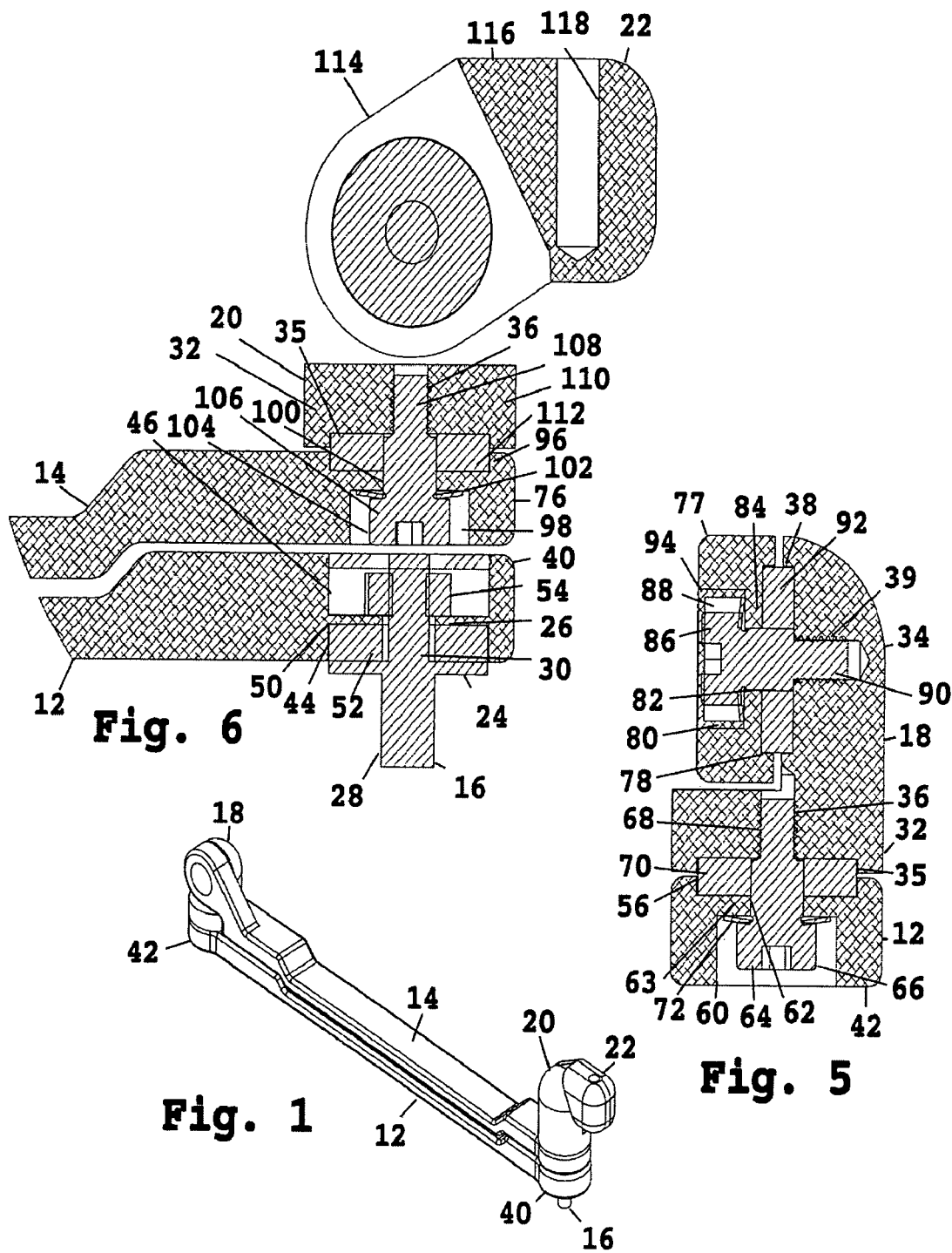

MOUNTING METHOD AND SYSTEM

BACKGROUND OF THE INVENTION

1. Field of the Invention

The present invention relates in general to a mounting device. It more particularly relates to a mounting method and system for extending an accessory from a piece of equipment, such as a video camera or other.

2. Background Art

There is no admission that the background art disclosed in this section legally constitutes prior art.

There have been a variety of mounting devices employing various arms and joints used for attaching a light or a flash unit to a piece of equipment such as a camera. For example, reference may be made to U.S. Pat. Nos. 3,855,602; 4,091,402; 5,075,706; 5,095,408; and 5,226,708.

When using a light on a hand held video camera, problems may occur with the quality of the picture under certain circumstances. For example, video lights may be located at the top of the camera directly above the lens shining light directly into the face of the subject. Lighting a subject in this manner may tend to flatten the features in the face of the subject and causes the subject to blink. The resultant appearance of the subject may be less than flattering and natural.

However, if the subject is lighted from the side and/or above, then the appearance of the subject may be more natural with depth due to the shadows on the contours of the face of the subject. Some videographers attempt to overcome the problems associated with the video light mounted above the camera by removing the light and holding it in their hand for certain applications. It may be difficult and awkward for the videographer to balance and control a video camera on their shoulder with one hand while holding and extending a video light with the other hand in certain circumstances.

BRIEF DESCRIPTION OF THE DRAWINGS

The features of this invention and the manner of attaining them will become apparent, and the invention itself will be best understood by reference to the following description of certain embodiments of the invention taken in conjunction with the accompanying drawings, wherein:

FIG. 1 is a perspective view of an embodiment of a mounting device of the present invention;

FIG. 5 is an end sectional view of the mounting device of FIG. 2 through line 5-5;

FIG. 6 is an enlarged view of section 6 of the mounting device of FIG. 4;

DESCRIPTION OF CERTAIN EMBODIMENTS OF THE INVENTION

Figure 7:
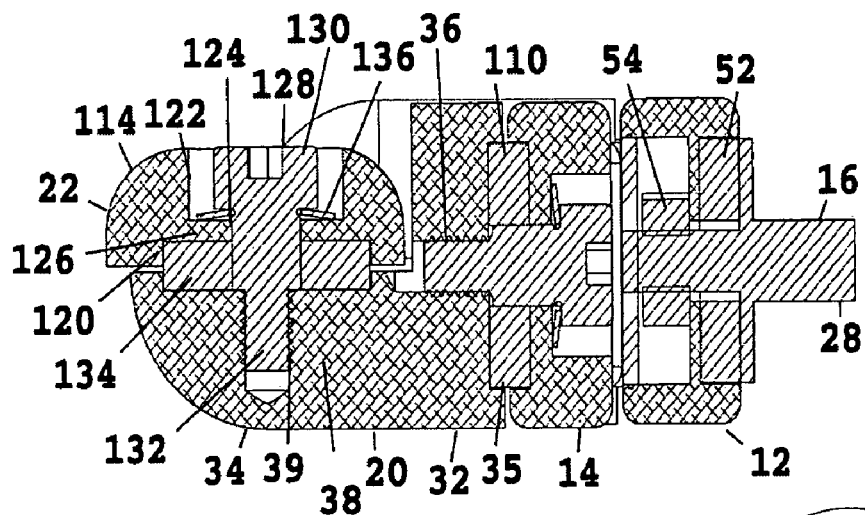
FIG. 7 is an end sectional view of the mounting device of FIG. 2 through line 7-7.
Figure 4:
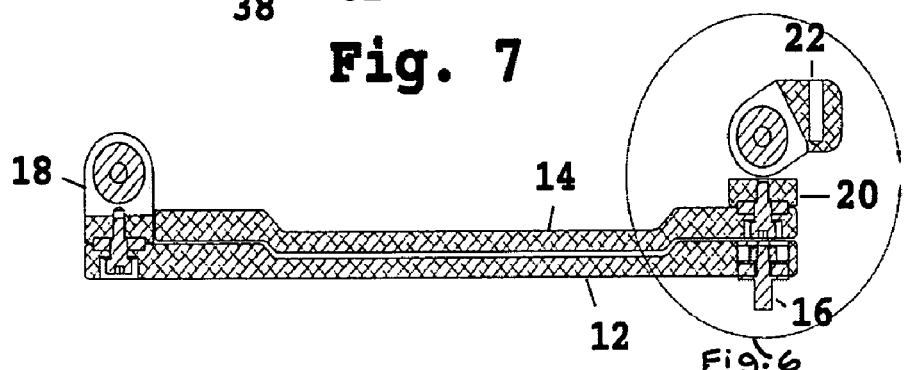
FIG. 4 is a side sectional view of the mounting device of FIG. 3 through line 4-4.
Figure 3:
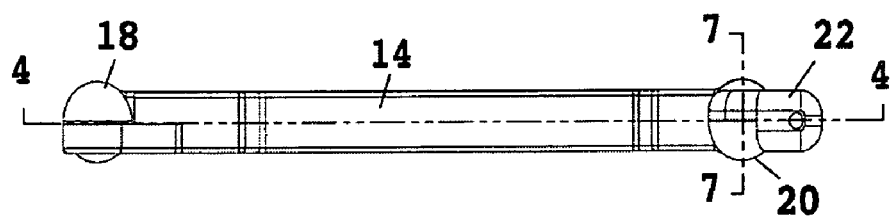
FIG. 3. is a top view of the mounting device of FIG. 1.
Figure 2:
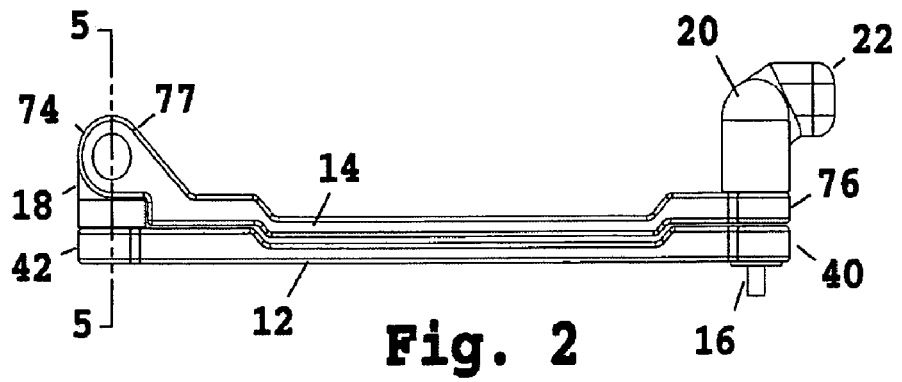
FIG. 2 is a side view of the mounting device of FIG. 1.

It will be readily understood that the components of the embodiments as generally described and illustrated in the drawings herein, could be arranged and designed in a wide variety of different configurations. Thus, the following more detailed description of the embodiments of the system, components and method of the present invention, as represented in the drawings, is not intended to limit the scope of the invention, as claimed, but is merely representative of the embodiments of the invention.

A method and system are disclosed, and may include a mounting device for a piece of equipment having an accessory receptacle. The mounting device may include at least two arms connected together providing at least two rotation axes, a mounting stud for mating with the accessory receptacle and connected to one of the two arms providing at least one rotation axis, and a mount for mating with an accessory of the equipment and connected to the other one of the two arms providing at least two rotation axes.

In accordance with another disclosed embodiment of the invention, there is provided a mounting device, which may include a first mounting member, a first arm connected to the first mounting member and having one axis of rotation with the first mounting member, a second arm connected to the first arm and having two axes of rotation with the first arm, a second mounting member connected to the second arm and having two axes of rotation with the second arm, and at least one disc spring at each axes of rotation to inhibit unintentional movement.

According to another aspect of a disclosed embodiment of the invention, there is provided a device for mounting accessories to a video camera. The device may include a first mounting member having a threaded male member for attaching to the video camera, a first arm connected to the first mounting member and having one axis of rotation with the first mounting member, a second arm connected to the first arm and having two axes of rotation with the first arm, a second mounting member connected to the second arm and having two axes of rotation with the second arm, the second mounted member includes a threaded female portion for mating with an accessory of the video camera, and at least one disc spring at each axes of rotation to inhibit unintentional movement.

According to yet another aspect of a disclosed embodiment of the present invention, there is provided a method of extending an accessory from a piece of equipment using a mounting device having at least two arms. The method may include attaching a first end of the mounting device to an accessory receptacle on the piece of equipment, attaching an accessory to a second end of the mounting device, and extending the accessory from the equipment by rotating the mounting device at the accessory receptacle and by rotating the arms of the mounting device in relation to each other.

Referring to FIGS. 1-7, an embodiment of the present invention as a mounting device is shown. The mounting device 10 may include a lower arm 12 and an upper arm 14. The lower arm 12 may include a mounting stud 16 adapted to be attached to a piece of equipment, such as a video camera or other equipment (not shown), and an axis housing 18. It is to be understood that this device 10 may be mounted on or to a variety of different types and kinds of equipment.

The upper arm 14 may include an axis housing 20 and a mount 22, adapted to accept an accessory of the piece of equipment, such as a video light or other device (not shown). It should be understood that while a video light is described, there may be a variety of different types and kinds of devices, which may be supported on the device 10. The mounting device 10 is shown with two arms, but the device may be designed with modular components so that additional arms may be included to extend the range of the device.

The mounting stud 16 may include a disc-like center portion 24 with a first threaded portion 26 and a second threaded portion 28 extending from the center of opposite sides of the center portion 24. The first threaded portion 26 may include a non-threaded section 30. The second threaded portion may be adapted to be connected to the accessory adapter of a piece of equipment.

Each axis housing 18 and 20 may include a circular base 32 and a half-dome shaped upper section 34 perpendicular to the circular base 32. The circular base 32 may include a recessed portion 35 with a threaded opening 36 at its center. The upper section 34 may also include a recessed portion 38 with a threaded opening 39 at its center.

The lower arm 12 may include a first end 40 for attaching the mounting stud 16 and a second end 42 for attaching the axis housing 18. The first end 40 may include a first recessed portion 44 and a second recessed portion 46 with an opening 48 extending between them in a wall 50. The first threaded portion 26 of the mounting stud 16 may extend through the opening 48 into the second recessed portion 46. A flat friction disc 52 may be disposed within the first recessed portion 44 and adjacent one side of the wall 50 and one side of the center portion 24 of the mounting stud 16. It should be understood that a second friction disc (not shown) or more friction discs may be employed to provide greater spring tension, if desired. The depth of the first recessed portion 44 may be slightly less than the width of the friction disc 52. A nut 54 and a disc spring 56 (FIGS. 5 and 6) may be disposed entirely within the second recessed portion 46 and over the first threaded portion 26 of the mounting stud 16 to hold the mounting stud 16 to the lower arm 12. The disc spring 56 may be disposed adjacent the other side of wall 50 and the nut 54 to apply a compression pressure between the wall 50 and the center portion 24 with the friction disc 52 located therebetween holding the lower arm 12 in position relative to the mounting stud 16 in the absence of any repositioning force. The lower arm 12 may rotate 360 degrees around the mounting stud 16 at the first end 40 of the lower arm 12.

The second end 42 of lower arm 12 may include a first recessed portion 58 and a second recessed portion 60 with an opening 62 extending between them in a wall 63. A screw 64 having a head 66 and a threaded portion 68 may extend through the opening 62 in the second end 42 and mate with the threaded opening 36 in the circular base 32 of the axis housing 18. A flat friction disc 70 may be disposed in the first recessed portion 58 of the second end 42 and the recessed portion 35 of the axis housing 18. The depth of the first recessed portion 58 of the second end 42 and the depth of the recessed portion 35 of axis housing 18 may both be slightly less than one half the width of the friction disc 70. A spring disc 72 may be disposed adjacent the head 66 of the screw 64 and the side of wall 63 located within the second recessed portion 60 to apply a compression pressure between the second end 42 of the lower arm 12 and the circular base 32 of axis housing 18 with the friction disc 70 located therebetween holding the axis housing 18 in position relative to the lower arm 12 in the absence of any repositioning force. The head 66 of screw 64 and the spring disc 72 may be disposed entirely within the second recessed portion 60 of second end 42. The axis housing 18 may rotate 360 degrees at the second end 42 of the lower arm 12.

The upper arm 14 may include a first end 74 for attaching to the axis housing 18 and a second end 76 for attaching the axis housing 20. The first end 74 may include an upwardly extending section 77 approximately one half the width of the upper arm 14. The extending section 77 may include a first recessed portion 78 and a second recessed portion 80 with an opening 82 extending between them in a wall 84. A screw 86 having a head 88 and a threaded portion 90 may extend through the opening 80 in the first end 74 and mate with the threaded opening 39 in the upper section base 34 of the axis housing 18. A flat friction disc 92 may be disposed in the first recessed portion 78 of the first end 74 and the recessed portion 38 of the axis housing 18. The depth of the first recessed portion 78 of the first end 74 and the depth of the recessed portion 38 of axis housing 18 may both be slightly less than one half the width of the friction disc 92. A spring disc 94 may be disposed adjacent the head 88 of the screw 86 and the side of wall 84 located within the second recessed portion 80 to apply a compression pressure between the first end 74 of the upper arm 14 and the upper section 34 of axis housing 18 with the friction disc 92 located therebetween holding the upper arm 14 in position relative to the axis housing 18 in the absence of any repositioning force. The head 88 of screw 86 and the spring disc 94 may be disposed entirely within the second recessed portion 80 of second end 74. The upper arm 14 may rotate over 180 degrees around the axis housing 18 at the upper section 34 of the axis housing 18.

The second end 76 of upper arm 14 may include a first recessed portion 96 and a second recessed portion 98 with an opening 100 extending between them in a wall 102. A screw 104 having a head 106 and a threaded portion 108 may extend through the opening 100 in the second end 76 and mate with the threaded opening 36 in the circular base 32 of the axis housing 20. A flat friction disc 110 may be disposed in the first recessed portion 96 of the second end 76 and the recessed portion 35 of the axis housing 20. The depth of the first recessed portion 96 of the second end 76 and the depth of the recessed portion 35 of axis housing 20 may both be slightly less than one half the width of the friction disc 110. A spring disc 112 may be disposed adjacent the head 106 of the screw 104 and the side of wall 102 located within the second recessed portion 98 to apply a compression pressure between the second end 76 of the upper arm 14 and the circular base 32 of axis housing 20 with the friction disc 110 located therebetween holding the axis housing 20 in position relative to the upper arm 14 in the absence of any repositioning force. The head 106 of screw 104 and the spring disc 112 may be disposed entirely within the second recessed portion 98 of second end 76. The axis housing 20 may rotate 360 degrees at the second end 76 of the upper arm 14.

The mount 22 may include a first end 114 for mounting with the upper section 34 of the axis housing 20 and a second end 116 having a threaded opening 118 to mate with an accessory of the equipment connected to the mounting device 10. The first end 114 of mount 22 may include a first recessed portion 120 and a second recessed portion 122 with an opening 124 extending between them in a wall 126. A screw 128 having a head 130 and a threaded portion 132 may extend through the opening 124 in the first end 114 and mate with the threaded opening 39 in the upper section base 34 of the axis housing 20. A flat friction disc 134 may be disposed in the first recessed portion 120 of the first end 114 and the recessed portion 38 of the axis housing 20. The depth of the first recessed portion 120 of the first end 114 and the depth of the recessed portion 38 of axis housing 20 may both be slightly less than one half the width of the friction disc 134. A spring disc 136 may be disposed adjacent the head 130 of the screw 128 and the side of wall 126 located within the second recessed portion 122 to apply a compression pressure between the first end 114 of the mount 22 and the upper section 34 of axis housing 20 with the friction disc 134 located therebetween holding the mount 22 in position relative to the axis housing 22 in the absence of any repositioning force. The head 130 of screw 128 and the spring disc 136 may be disposed entirely within the second recessed portion 122 of first end 114. The mount 22 may rotate approximately 180 degrees around the axis housing 20 at the upper section 34 of the axis housing 20.

The lower arm 12, the upper arm 14, the axis housings 18 & 20, and the mount 22 may all be manufactured from a metal material, such as aluminum or other suitable material to provide strength and help avoid damage during handling. The friction discs 52, 70, 92, 108, & 134 may all be identical and manufactured by Key Bellevilles, Inc., having a place of business at 100 Key Lane, Leechburg, Pa. 15656-9531.

When additional arms are included on the mounting device, the number of rotational axis at the connection points of the arms may vary depending on the location of the arm in the mounting device and the specific application of the mounting device. Typically, each connection point may include one or two axes of rotation.

Figure 8:
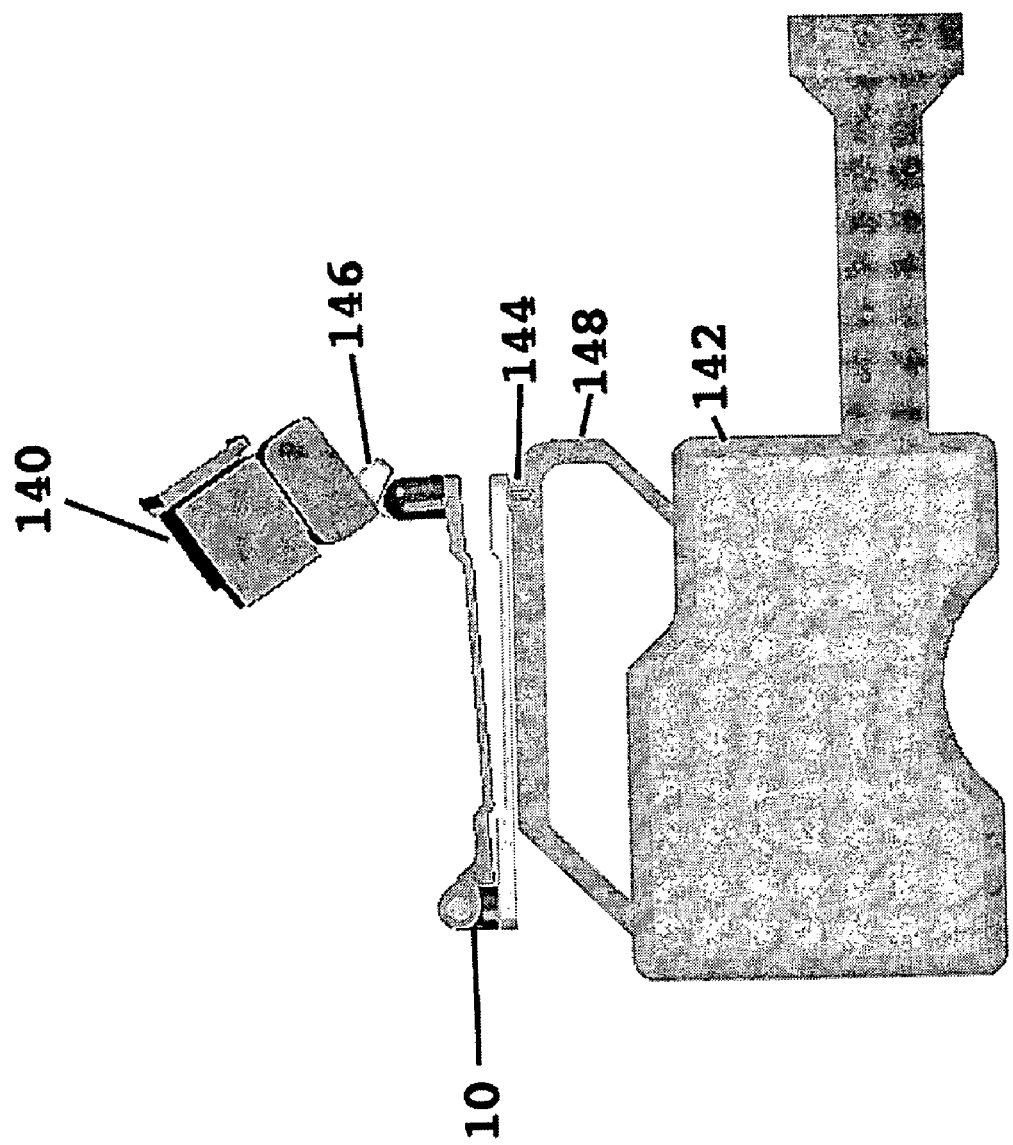
FIG. 8 is a pictorial view of the mounting device of FIG. 1 attached to a video camera and holding a video light.

Referring now to FIG. 8, the mounting device 10 is shown mounting a video light 140 to a video camera 142. The mounting device 10 using the mounting stud 16 may be attached to an accessory mounting receptacle 144 on the top of the video camera 142. The video light 140 may include a mounting screw 146 for mating with the mount 22 on the mounting device 10. With the mounting device 10 in its fully retracted position, the mounting device 10 may be parallel with a handle 148 on video camera 142 and may be used in cooperation with the handle 148 to carry the video camera 142. A center portion of each of the arms may be manufactured such that their thickness is less than the ends of each arm and such that the arms fit within one another reducing the thickness of the device when used in cooperation with the handle of the video camera. The length of each of the arms may be approximately ten inches to fit compactly on the handle of the video camera during its retracted state.

In use the mounting device 10 may position the video light 140 in a plurality of different positions using the five axes of rotation provided by the mounting device 10. The mounting device 10 may rotate 360 degrees around the accessory mounting receptacle 144. At the connection point of the two arms, the arms may rotate 360 degrees in a first direction and at least 180 degrees in a second perpendicular direction. The mount 22 may rotate 360 degrees in a first direction and at least 180 degrees in a second perpendicular direction in relation to the upper arm of the mounting device 10.

The mounting device 10 may not only be used with a variety of other portable pieces of equipment, such as a still picture camera, an audio recorder, a video player, and others, but also with stationary or semi-stationary devices, such as desks, rolling decks, medical equipment, and others. The mounting device 10 may also be used with a variety of accessories other than a video light, such as a flash unit, a microphone, a monitor, or other light weight device.

While particular embodiments of the present invention have been disclosed, it is to be understood that various different embodiments are possible and are contemplated within the true spirit and scope of the appended claims. There is no intention, therefore, of limitations to the exact abstract or disclosure herein presented.

What is claimed is:

1. A mounting device for a piece of equipment having an accessory receptacle, comprising
   at least two rectilinear upper and lower arms connected together providing at least two rotation axes;
   the lengths of the two arms being substantially the same;
   the shapes of the two arms being substantially the same;
   a mounting stud for mating with the accessory receptacle and connected to one end of the lower arm providing at least one rotation axis between the piece of equipment and the lower arm;
   a mount for mating with an accessory of the equipment and connected to one end of the upper arm providing at least two rotation axes;
   a first axis housing connecting the one end of the upper arm to the mount with two rotational axes;
   the first axis housing having at least two portions connected together adjustably with a first flat friction disc disposed therebetween;
   a second axis housing connecting the other end of the upper arm to the other end of the lower arm and having two rotational axes;
   the second axis housing having at least two portions connected together adjustably with a second flat friction disc disposed therebetween;
   wherein the first and second axis housings enable substantially 360° of rotation in at least one of its axis of rotation and at least 180° in its other axis of rotation; and
   wherein the lengths and shapes of the two arms and the orientation of the mounting stud and the mount permit the arms to be folded together in an overlaying configuration to assume a compact package having a length substantially the same as the length of each one of the two arms.

2. The device of claim 1 further including at least one adjustment screw at each axis housing.

3. The device of claim 2 further including at least one spring disc at each axis housing.

4. The device of claim 1, wherein the mounting stud includes a threaded portion for mating with the accessory receptacle.

5. A mounting device, comprising
   a first mounting member;
   a rectilinear first arm having a first end connected to the first mounting member and having one axis of rotation with the first mounting member;
   a rectilinear second arm having a first end connected to a second end of the first arm and having two axes of rotation with the first arm;
   the lengths of the first and second arms being substantially the same;
   the shapes of the first and second arms being substantially the same;
   a second mounting member connected to a second end of the second arm and having two axes of rotation with the second arm;
   at least one disc spring at each axes of rotation to inhibit unintentional movement;
   a first axis housing connecting the second end of the second arm to the second mounting member with two rotational axes;
   the first axis housing having at least two portions connected together adjustably with a first flat friction disc disposed therebetween;
   a second axis housing connecting the second end of the first arm to the first end of the second arm and having two rotational axes;
   the second axis housing having at least two portions connected together adjustably with a second flat friction disc disposed therebetween;
   wherein the first and second axis housings enable substantially 360° of rotation in at least one of its axis of rotation and at least 180° in its other axis of rotation; and wherein the lengths and shapes of the first and second arms and the orientation of the first mounting member and the second mounting member permit the arms to be folded together in an overlapping configuration to assume a compact package having a length substantially the same as the length of each one of the arms.

6. The mounting device of claim 5 further including at least one adjustment screw at each axis housing.

7. The mounting device of claim 5, wherein the first mounting member includes a threaded portion.

8. The mounting device of claim 5, wherein the second mounting member includes a threaded portion.

9. A device for mounting accessories to a video camera, comprising
- a first mounting member having a threaded male member for attaching to the video camera;
- a rectilinear first arm having a first end connected to the first mounting member and having one axis of rotation with the first mounting member;
- a rectilinear second arm having a first end connected to a second end of the first arm and having two axes of rotation with the first arm;
- the lengths of the first and second arms being substantially the same;
- the shapes of the first and second arms being substantially the same;
- a second mounting member connected to a second end of the second arm and having two axes of rotation with the second arm, the second mounted member includes a threaded female portion for mating with an accessory of the video camera;
- at least one disc spring at each axes of rotation to inhibit unintentional movement;
- a first axis housing connecting the second end of the second arm to the second mounting member with two rotational axes;
- the first axis housing having at least two portions connected together adjustably with a first flat friction disc disposed therebetween;
- a second axis housing connecting the second end of the first arm to the first end of the second arm and having two rotational axes;
- the second axis housing having at least two portions connected together adjustably with a second flat friction disc disposed therebetween;
- wherein the first and second axis housings enable substantially 360° of rotation in at least one of its axis of rotation and at least 180° in its other axis of rotation; and
- wherein the lengths and shapes of the first and second arms and the orientation of the first mounting member and the second mounting member permit the arms to be folded together in an overlapping configuration to assume a compact package having a length substantially the same as the length of each one of the arms.

10. The device of claim 9 further including at least one adjustment screw at each axis housing.

* * * * *